(12) United States Patent
Okano et al.

(10) Patent No.: US 8,136,954 B2
(45) Date of Patent: Mar. 20, 2012

(54) LINEAR LIGHT SOURCE BACKLIGHT SYSTEM AND PLANAR DISPLAY DEVICE

(75) Inventors: Masanobu Okano, Nara (JP); Yoshitake Nakamura, Taki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 295 days.

(21) Appl. No.: 11/916,121

(22) PCT Filed: Mar. 17, 2006

(86) PCT No.: PCT/JP2006/305369
§ 371 (c)(1),
(2), (4) Date: Nov. 30, 2007

(87) PCT Pub. No.: WO2006/129409
PCT Pub. Date: Dec. 7, 2006

(65) Prior Publication Data
US 2009/0046444 A1    Feb. 19, 2009

(30) Foreign Application Priority Data
Jun. 3, 2005   (JP) .................. 2005-164244

(51) Int. Cl.
*F21V 8/00* (2006.01)
(52) U.S. Cl. ...... 362/97.1; 362/97.2; 362/606; 362/611; 362/612; 362/613; 362/620; 362/561; 362/97.3
(58) Field of Classification Search .............. 362/97.1, 362/606, 611, 612, 613, 620, 561, 511, 97.2, 362/97.3, 330; 349/61, 62, 65, 67–71
See application file for complete search history.

(56) References Cited

U.S. PATENT DOCUMENTS

| 5,613,751 | A | * | 3/1997 | Parker et al. ................. 362/627 |
| 5,727,862 | A | * | 3/1998 | Wu ............................. 362/27 |
| 5,769,521 | A | * | 6/1998 | Osawa et al. ................. 362/27 |
| 6,867,826 | B2 | | 3/2005 | Miyashita |
| 7,073,933 | B2 | | 7/2006 | Gotoh et al. |

FOREIGN PATENT DOCUMENTS

| JP | 11-224516 A | 8/1999 |
| JP | 2000-268619 A | 9/2000 |
| JP | 2002-093232 A | 3/2002 |
| JP | 2002-216529 A | 8/2002 |

OTHER PUBLICATIONS

Official communication issued in the International Application No. PCT/JP2006/305369, mailed on Jun. 13, 2006.

* cited by examiner

*Primary Examiner* — Sharon Payne
(74) *Attorney, Agent, or Firm* — Keating & Bennett, LLP

(57) ABSTRACT

A small-size and light-weight backlight system and a planar display device has a structure such that luminance unevenness and chromaticity unevenness in the vicinity of the incident light portion of a light guide plate are not noticeable. The back light system includes a light guide plate arranged to guide the light from a light source and emit the light in a planar direction. The light source includes a linear light source body arranged in the vicinity of the side edge of the light guide plate. The linear light source body includes a linear body in which a plurality of light emitting elements are embedded in the longitudinal direction. A light direction change sheet is arranged on the light emission surface of the light guide plate. The light direction change sheet has a plurality of protruding stripes arranged substantially parallel to the longitudinal direction of the linear light source body formed on the surface opposing to the light guide plate.

4 Claims, 4 Drawing Sheets

|  | PRACTICAL EXAMPLE | COMPARATIVE EXAMPLE1 | COMPARATIVE EXAMPLE2 | COMPARATIVE EXAMPLE3 |
|---|---|---|---|---|
| EVENNESS | ○ | × | × | × |
| BRIGHTNESS [cd/m²] | 970 | 790 | 562 | 677 |

LINEAR LIGHT SOURCE BACKLIGHT SYSTEM AND PLANAR DISPLAY DEVICE

BACKGROUND OF THE INVENTION

1. Field of the Invention

The present invention relates to a linear light source backlight system of an edge lighting type for use in a planar display device. More particularly, the present invention is suitably applicable, for example, to a back light system provided with a light guide plate that feeds light from a light source to a liquid crystal panel, and to a liquid crystal display device incorporating such a backlight system.

2. Description of the Related Art

In recent years, advancements have actively been made in liquid crystal display devices toward larger screens, higher picture quality, higher resolution, further reduced thickness and weight, lower power consumption, and lower cost. In particular, the performance and structure of backlight systems incorporated in liquid crystal display devices hold the key to improvements in the performance of liquid crystal display devices in terms of efficiency, brightness, power consumption, frame width, and slimness, and thus greatly affect the performance of liquid crystal display devices.

Today, backlight systems for use in liquid crystal display devices are divided into a behind-the-panel type, which has a light source arranged at the back of a panel, and an edge-lighting type, which uses a light guide plate and has a light source arranged close to a side edge of the light guide plate. In liquid crystal display devices in which slimness matters, the edge-lighting type is adopted.

Used as light sources in backlight systems are cold cathode fluorescent tubes and light-emitting diodes (hereinafter also referred to as "LEDs"). Compared with cold cathode fluorescent tubes, light-emitting diodes have the advantages of being less expensive, less power-consuming, and less space-consuming.

A disadvantage with using an LED as a light source in an edge-lighting backlight system and arranging the LED close to a side edge of a light guide plate is that, since an LED is a point light source, the LED tends to produce more noticeable unevenness in brightness and chromaticity near where light enters the light guide plate (at the side edge thereof where the LED is arranged), than does a cold cathode fluorescent tube, which is a linear light source. To prevent such unevenness in brightness and chromaticity near where light enters a light guide plate, as shown in FIG. 6, in conventional liquid crystal display devices, it is customary to arrange a plurality (in the example shown, three) of LEDs 120 along a side edge of a light guide plate 200 and a part of the light guide plate 200 near where light enters it is left as non-display portion 202. That is, the light guide plate 200 is laid over an area larger, toward the LEDs 120, than the display area 201 of the liquid crystal display device, and the part of the light guide plate 200 that lies beyond the display area 201 is left as a non-display portion 202 from which no light comes out. Thus, inconveniently, adopting this structure creates a large dead space, and therefore makes it difficult to reduce the frame width in liquid crystal display devices.

As shown in FIG. 7, one type of backlight system that uses LEDs 120 as a light source as described above has a diffusive sheet 500 and lens sheets 600 (hereinafter also referred to as "BEFs") arranged on the light-exit surface (front surface) of a light guide plate 200, and has a reflective sheet 400 arranged on the back surface of the light guide plate 200. Here, the lens sheets 600 each have an array of prisms formed on one side, and are arranged on the light-exit surface of the light guide plate 200 with the prism surfaces of the lens sheets 600 facing where the viewer is supposed to be (facing forward). In the example shown, two BEFs 600 are arranged on the front surface of the light guide plate with the prism array of one of the lens sheets 600 perpendicular to that of the other. Inconveniently, adopting this structure requires an increased number of components, and results in, in exchange for a better viewing angle characteristic, low brightness in the direction normal to the light-exit surface as a result of the light from LEDs 120 being emitted through a plurality of members (the light guide plate, the diffusive sheet, and the two BEFs) and thus being more diffused than in an edge-lighting backlight system like the one described below.

One well-known example of using a cold cathode fluorescent tube, which is a linear light source, as a light source in an edge-lighting backlight system is disclosed in JP-A-H11-224516. According to JP-A-H11-224516, a cold cathode fluorescent tube is arranged close to a side edge of a light guide plate, and the light-exit surface (front surface) of the light guide plate, or the opposite surface (back surface) thereof, is formed into a coarse surface; a reflective sheet is arranged on the back surface of the light guide plate, and a lens sheet is arranged, with the prism surface thereof facing down, on the front surface of the light guide plate. Here, arranging the lens sheet with the prism surface thereof facing down means that the lens sheet is arranged such that the side thereof on which it has an array of prisms formed faces the light-exit surface of the light guide plate. Inconveniently, however, as described previously, adopting a cold cathode fluorescent tube, compared with an LED, has the disadvantages of being more expensive, more power-consuming, and more space-consuming.

An LED may be used as a light source in the backlight system disclosed in JP-A-H11-224516. Even doing so, however, does not make it any easier to reduce the frame width in liquid crystal display devices because of unevenness in brightness and chromaticity near where light enters the light guide plate.

SUMMARY OF THE INVENTION

In order to overcome the problems described above, preferred embodiments of the present invention provide a backlight system, and also a planar display device incorporating it, that operates with less noticeable unevenness in brightness and chromaticity near where light enters a light guide plate and that contributes to size and weight reduction.

According to a preferred embodiment of the present invention, a backlight system includes a light source and a light guide plate arranged to guide light from the light source so as to surface-emit the light, the light source including a linear light source member arranged close to a side edge of the light guide plate, wherein the linear light source member includes a linear member body having a plurality of light-emitting elements buried in the direction of the longer sides thereof, the light guide plate has a light-deflecting sheet arranged on the light-exit surface thereof, and the light-deflecting sheet has, disposed on the surface thereof facing the light-exit surface of the light guide plate, a plurality of projecting stripe members arranged substantially parallel to the direction of the longer sides of the linear light source member.

In the linear light source backlight system structured as described above, the light from a linear light source member is fed to the light guide plate. Since the linear light source member includes light-emitting elements, it, compared with a conventional one using a cold cathode fluorescent tube, has the advantages of being less expensive, less power-consuming, and less space-consuming. Moreover, since the linear light source member used as the light source has a plurality of light-emitting elements buried in a linear member body, unlike in a structure in which light-emitting elements are simply arranged close to a side edge of a light guide plate, of the light emitted from the light-emitting elements, the portion that does not travel toward the light guide plate (for example, the portion traveling in the axial direction (the longer-side direction)) is reflected on the linear member body so as to go out of the accommodation spaces (transparent resin) through the openings thereof. This results in less unevenness in brightness and chromaticity near where light enters the light guide plate, and also helps reduce the area of the so-called non-display portion. Thus, it is possible to reduce the frame width in display devices.

According to the present invention, it is preferable to adopt a structure in which the linear member body has a plurality of accommodation spaces in which the light-emitting elements are accommodated, the accommodation spaces having openings at the side thereof facing the light guide plate, the accommodation spaces being filled with transparent resin with the light-emitting elements accommodated therein; and the openings of the accommodation spaces each measure approximately 4.0 mm or more in the direction of the longer sides thereof.

With this structure, the light emitted from the light-emitting elements goes out of the accommodation spaces through the openings thereof so as to be fed to the light guide plate, and the openings each measure approximately 4.0 mm or more in the direction of the longer sides thereof. This results in less unevenness in brightness and chromaticity near where light enters the light guide plate.

According to various preferred embodiments of the present invention, thanks to less unevenness in brightness and chromaticity near where light enters the light guide plate as described above, it is possible to adopt a structure in which the light-emitting elements are so arranged that the distance between adjacent light-emitting elements is about 7.0 mm or more. Adopting this structure helps reduce the number of light-emitting elements, and thus helps reduce power consumption and cost. Here, the "distance between adjacent light-emitting elements" denotes the center-to-center distance between those light-emitting elements. In a case where there are three or more light-emitting elements provided and thus there are a plurality of such "distances between adjacent light-emitting elements", these "distances between adjacent light-emitting elements" do not need to be all equal but may be different.

According to various preferred embodiments of the present invention, thanks to less unevenness in brightness and chromaticity near where light enters the light guide plate as described above, it is possible to adopt a structure in which the distance between adjacent light-emitting elements is twice or more as large as the distance from the display region of a module (liquid crystal panel) to the side edge of the light guide plate that the linear light source member is arranged close to. This helps reduce the number of light-emitting elements, and thus helps reduce power consumption and cost.

According to various preferred embodiments of the present invention, it is possible not only to arrange one linear light source member close to one side edge of a light guide plate, but also to arrange a pair of linear light source members close to opposite side edges of a light guide plate, or to arrange four linear light source members with one close to each of the four side edges of the light guide plate.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
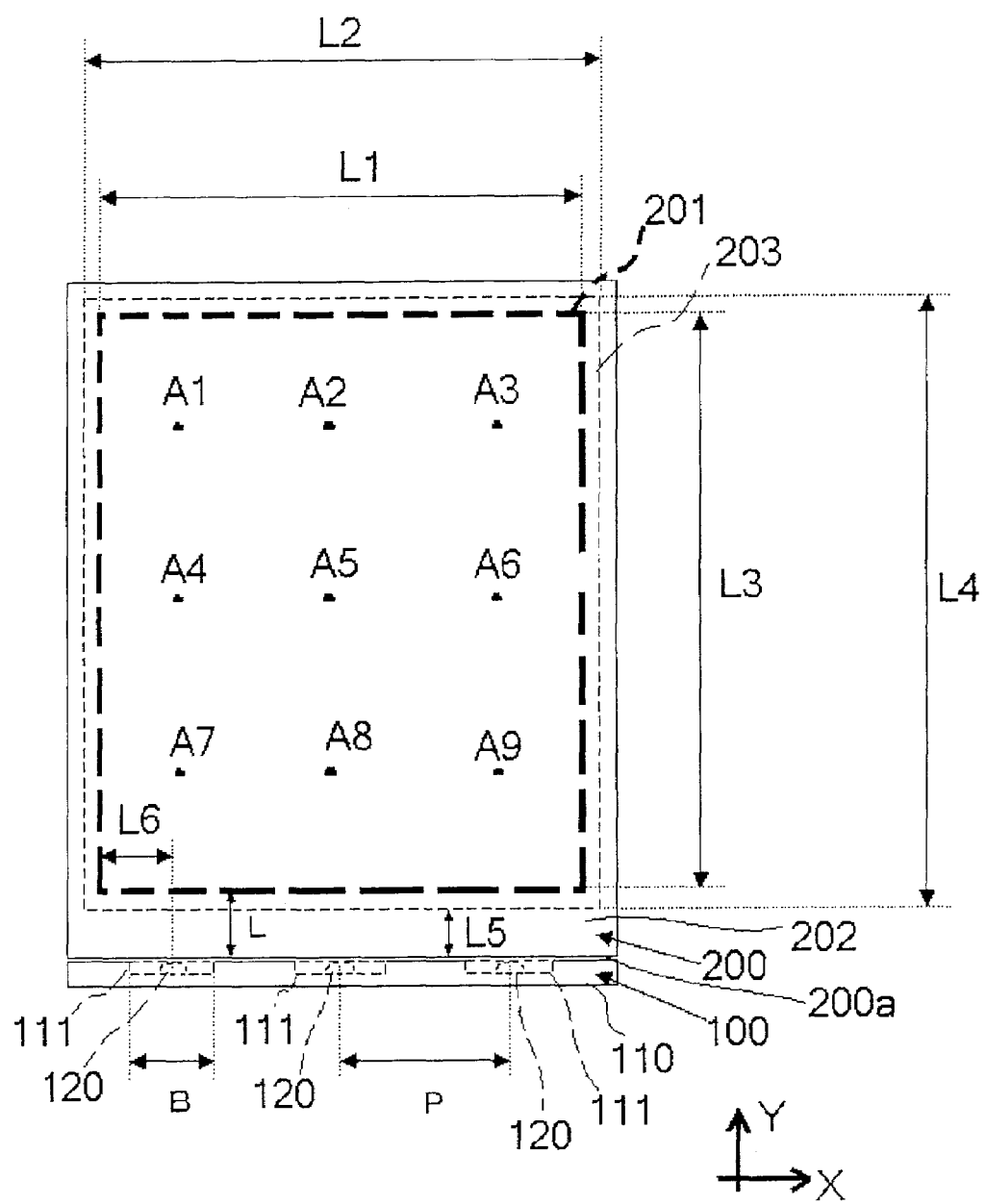
FIG. 1 is a schematic plan view of a backlight system according to a preferred embodiment of the present invention.
Figure 2:
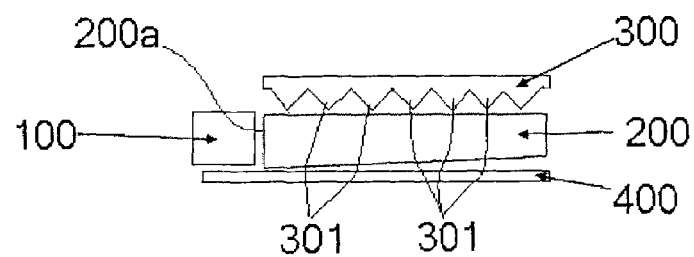
FIG. 2 is a schematic side view of the preferred embodiment of the present invention shown in FIG. 1.
Figure 3:
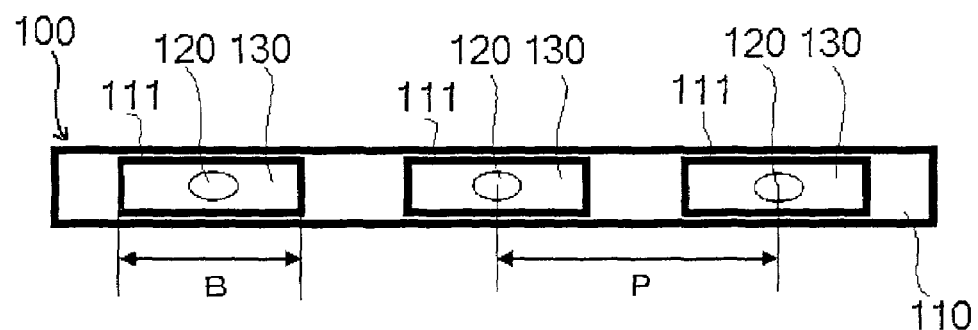
FIG. 3 is a schematic side view of the linear light source member in the backlight system of the preferred embodiment of the present invention shown in FIG. 1.
Figure 4:
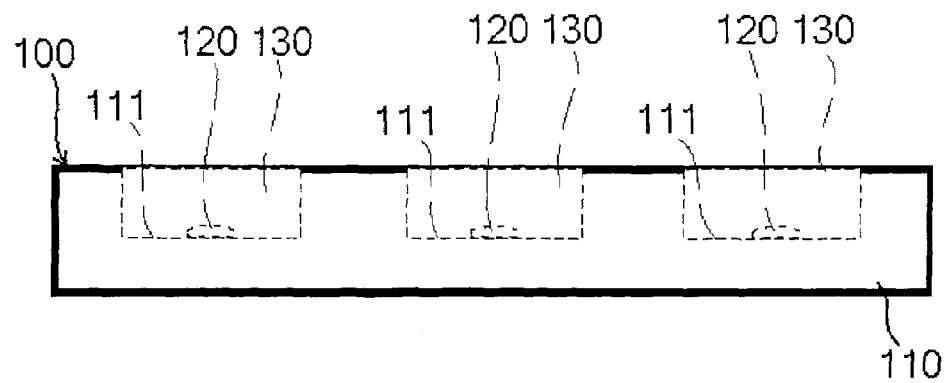
FIG. 4 is a schematic plan view of the linear light source member in the backlight system of the preferred embodiment of the present invention shown in FIG. 1.
Figures 5, 6:
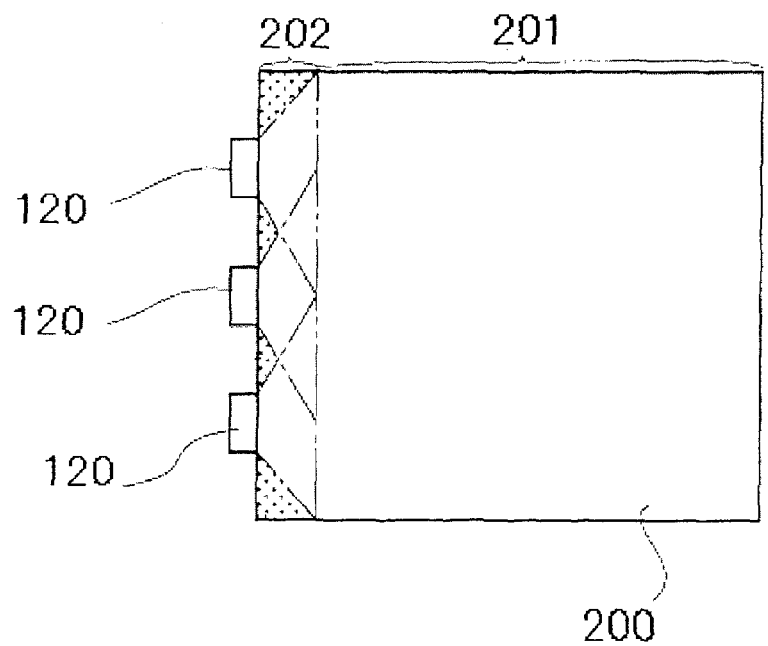
FIG. 5 is a table showing the results of experiments with the backlight system of preferred embodiments of the present invention in comparison with a few comparative examples.
FIG. 6 is a schematic plan view of a conventional example of a backlight system.

Hereinafter, with reference to the accompanying drawings, a backlight system for use in a liquid crystal display device will be described according to preferred embodiments of the present invention. FIG. 1 is a schematic plan view of a backlight system, as one preferred embodiment of the present invention (here, a light-deflecting sheet is omitted from illustration). FIG. 2 is a schematic side view of the present preferred embodiment. FIG. 3 is a schematic side view of a linear light source member in the backlight system of the present preferred embodiment. FIG. 4 is a schematic plan view of the linear light source member in the backlight system of the present preferred embodiment. FIG. 5 is a table showing the results of experiments with the backlight system of the preferred embodiments in comparison with a few comparative examples.

As shown in FIG. 2, the backlight system of the present preferred embodiment preferably includes a linear light source member 100; a light guide plate 200 that guides the light from the linear light source member 100 such that the light guide plate 200 surface-emits it through the light-exit surface (front surface) thereof; a light-deflecting sheet 300 arranged on the light-exit surface (front surface) of the light guide plate 200; and a reflective sheet 400 that is arranged on the back surface (the surface opposite to the light-exit surface) of the light guide plate 200. On the light-exit surface (front surface) side of the light-deflecting sheet 300, a liquid crystal panel (unillustrated) is arranged.

The linear light source member 100 is arranged close to one side edge 200a of the light guide plate 200, and the light guide plate 200 is preferably generally wedge-shaped, being increasingly thin from the side edge 200a thereof that the linear light source member 100 is arranged close to, toward the opposite side edge of the light guide plate 200. Specifically, the surface (back surface) of the light guide plate 200 opposite to the light-exit surface thereof is inclined so as to be increasingly close to the light-exit surface from the side edge 200a that the linear light source member 100 is arranged close to toward to the opposite side edge.

Moreover, in this preferred embodiment, as shown in FIG. 1, the light guide plate 200 is so designed that the light-exit area 203 thereof is slightly larger than the display area 201 of the liquid crystal display device.

Specifically, whereas the display area 201 preferably has a length L1 of about 46.08 mm in the direction X of the longer sides of the linear light source member 100, the light-exit area 203 preferably has a length L2 of about 49.7 mm in the direction X of the longer sides of the linear light source member 100, for example. The light-exit area 203 of the light guide plate 200 thus lies about 1.81 mm (=(L2−L1)/2) beyond each of the opposite edges of the display area 201 in the direction of the longer sides thereof.

Moreover, whereas the display area 201 preferably has a length L3 of about 61.4 mm in the direction Y perpendicular to the longer sides of the linear light source member 100 (this direction is also referred to as the "direction of the shorter sides" thereof), the light-exit area 203 preferably has a length L4 of about 65.0 mm in the direction Y of the shorter sides of the linear light source member 100, for example. The light-exit area 203 of the light guide plate 200 thus lies about 1.78 mm (=(L4−L3)/2) beyond each of the opposite edges of the display area 201 in the direction of the shorter sides thereof.

Furthermore, the light guide plate 200 is arranged such that the distance L5 from the light-exit area 203 to the side edge 200a at which the linear light source member 100 is arranged is about 4.62 mm, and that the distance L from the display area 201 to the side edge 200a at which the linear light source member 100 is arranged is about 6.4 mm, for example. That is, a portion of the light guide plate 200 located close to the linear light source member 100 is left as a non-display area 202, the non-display portion 202 having a length L of about 6.4 mm in the direction Y of the shorter sides of the non-display portion 202, for example.

The light-deflecting sheet 300 is a lens sheet, and is arranged with the lens surface thereof facing the light-exit surface of the light guide plate 200. Specifically, the light-deflecting sheet 300 has, formed on the back surface thereof (the surface thereof facing the light-exit surface of the light guide plate 200) an array of prisms 301, the prisms being arranged substantially parallel to the side edge 200a that the linear light source member 100 is arranged close to, and having a substantially triangular cross-sectional shape in the direction perpendicular to the side edge 200a. This light-deflecting sheet 300 is preferably formed, for example, by forming an array of prisms 301 with acrylic resin on one side of a polyester film sheet having smooth surfaces on both sides, and the light-deflecting sheet 300 is arranged such that the apices of the prisms 301 thereof make contact with the light-exit surface of the light guide plate 200. Although this preferred embodiment deals with an example in which an array of prisms 301 defines a plurality of projecting stripe members, it is also possible to adopt, instead, a lens sheet having an array of lenticular lenses having a substantially semicircular cross-sectional shape in the direction perpendicular to the side edge 200a.

The linear light source member 100 preferably includes a linear member body 110 having substantially the same length as the side edge 200a of the light guide plate 200; a plurality of (in the example shown, three) light-emitting diodes 120 (hereinafter referred to as "LEDs") arranged in accommodation spaces 111 formed in the linear member body 110; and transparent resin 113 with which the accommodation spaces 111 are filled (see FIGS. 3 and 4).

Here, the accommodation spaces 111 in the linear member body 110 have openings at the side (the light-exit surface side) thereof facing the light guide plate 200, and the accommodation spaces 111 each have a length B of about 10.0 mm in the direction X of the longer sides of the linear member body 110, for example. It is preferable that the length B of each of the accommodation spaces 111 in the longer-side direction X be about 4.0 mm or more.

In the linear member body 110, the LEDs 120 are arranged one at the center of each of the accommodation spaces 111 in the direction of the longer sides thereof. The distance P between adjacent ones of the LEDs 120 (the distance between their respective centers) is preferably about 15.5 mm, for example, and the center of the LED 120 arranged in each of the accommodation spaces 111 located at both ends of the linear member body 110 in the direction of the longer sides thereof is located at a distance of about 7.54 mm, for example, from the corresponding edge of the display area 201 in the longer-side direction X. It is preferable that the distance P between adjacent ones of the LEDs 120 be about 7.0 mm or more, for example.

In this preferred embodiment structured as described above, the distance P between adjacent ones of the LEDs 120 and the distance L (in the direction Y of the shorter sides of the non-display portion 202) from the display area 201 to the linear light source member 100 side edge 200a fulfill the following conditional formula:

$$0 < L/P \leq 0.5 \, (L/P \approx 0.413)$$

Moreover, in the linear member body 110, the accommodation spaces 111 are each formed substantially in the shape of a rectangular parallelepiped as a whole, and the linear member body 110 is, for example, integrally molded out of molding resin. The accommodation spaces may be formed, instead of substantially in the shape of a rectangular parallelepiped, in a trapezoidal or other shape. In the accommodation spaces 111 in the linear member body 110 thus integrally molded, the LEDs 120 are accommodated; then, the accommodation spaces 111 are filled with transparent resin 130. Used as the transparent resin here is, for example, transparent resin such as polyester or epoxy resin.

Practical Example

With the backlight system of the preferred embodiment described above, which uses the linear light source member 100, a current was passed through the LEDs 120 such that the power consumption was about 63 mW, and brightness was measured at nine spots (A1 to A9 in FIG. 1) on the backlight system. The measured brightness averaged about 970 cd/m$^2$, and substantially even display was obtained. Incidentally, brightness was measured at an angle of measurement of 1°, using a spectroradiometer, model SR-3, (manufactured by TOPCON Corporation).

Comparative Example 1

For comparison with the preferred embodiment described above, the same tests as those performed with the practical example presented above were performed with a backlight system that used a light guide plate 200 and a light-deflecting sheet 300 like those used in the preferred embodiment described above but that had three separate LEDs 120 arranged at the side edge 200a (see FIG. 6). The brightness measured at nine spots on the backlight system averaged about 790 cd/m$^2$, and the display was not even over the entire display region, resulting in commercially unacceptable display quality.

Comparative Example 2

Figure 7:
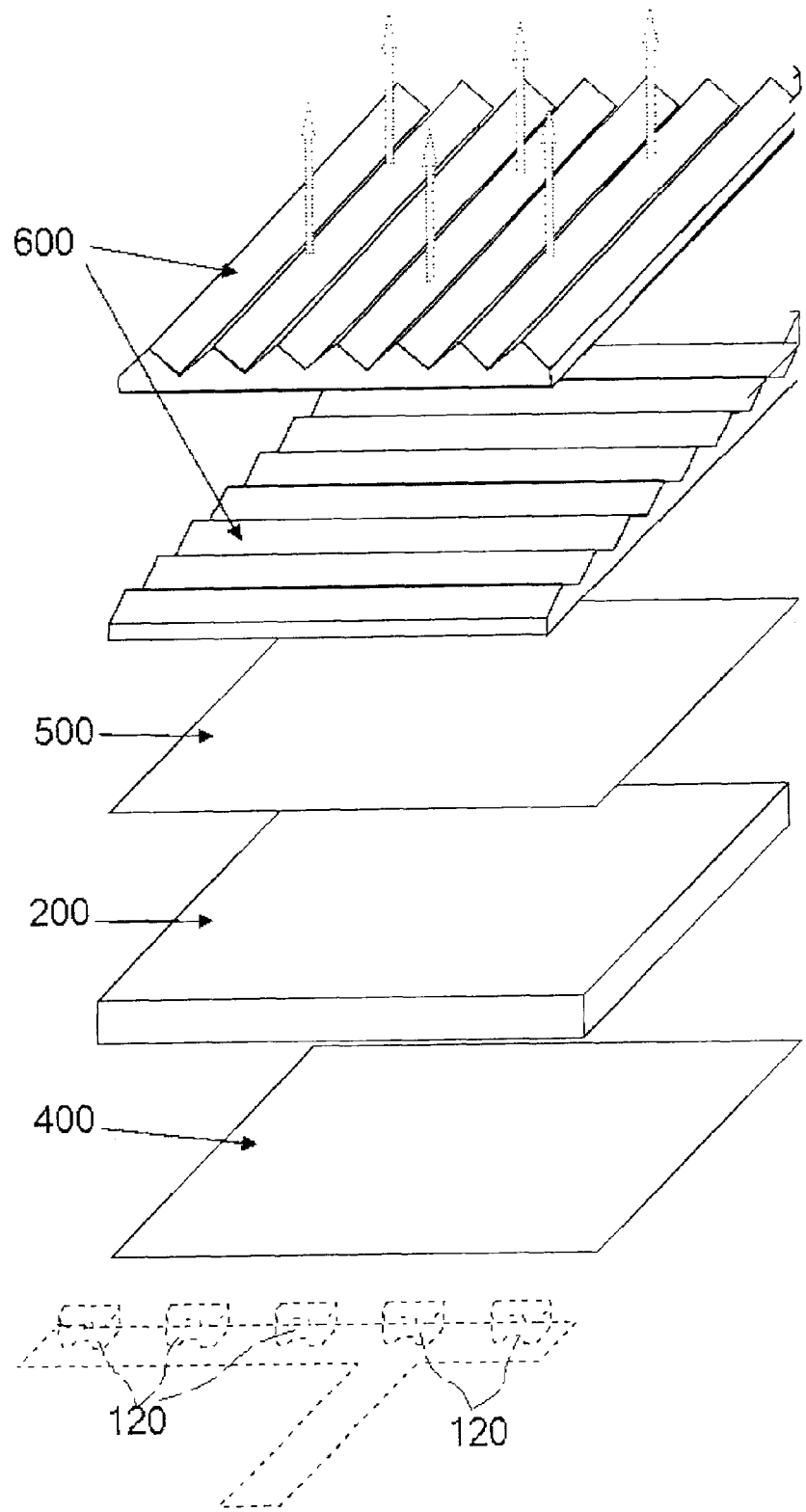
FIG. 7 is a schematic exploded perspective view illustrating a conventional example of a backlight system.

For further comparison with the preferred embodiment described above, the same tests as those performed with the practical example presented above were performed with a backlight system that used a light guide plate 200 like that used in the preferred embodiment described above, that had a diffusive sheet and two lens sheets arranged on the light-exit surface (front surface) of the light guide plate 200 as shown in FIG. 7, and that used three separate LEDs 120 as a light source like the comparative example 1 presented above. Although substantially even display was obtained over the entire display region, the brightness measured at nine spots on the backlight system averaged about 562 cd/m$^2$, resulting in lower brightness in the normal direction over the entire display region than with the practical example presented above.

Comparative Example 3

For still further comparison with the preferred embodiment described above, the same tests as those performed with the practical example presented above were performed with a backlight system that used a light guide plate 200 like that used in the preferred embodiment described above, that had a diffusive sheet and two lens sheets arranged on the light-exit surface (front surface) of the light guide plate 200 as in comparative example 2 presented above, and that used as a light source a linear light source member like the one used in the preferred embodiment described above. Although substantially even display was obtained over the entire display region, the brightness measured at nine spots on the backlight system averaged about 677 cd/m$^2$, resulting in lower brightness in the normal direction over the entire display region than with the practical example presented above.

As described above, according to the preferred embodiments of the present invention, compared with conventional backlight systems, it is possible to alleviate unevenness in brightness and chromaticity, and to achieve reduction in size and power consumption.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A backlight system comprising:
a light source;
a light guide plate arranged to guide light from the light source so as to surface-emit the light; wherein
the light source includes a linear light source member arranged close to a side edge of the light guide plate;
the linear light source member includes a linear member body including a plurality of accommodation spaces defined side-by-side therein in a direction extending along longer sides thereof such that individual partitions are arranged between the side-by-side accommodation spaces;
each of the plurality of the side-by-side accommodation spaces including an opening at a side thereof facing the light guide plate and housing only one light-emitting element, and a distance between adjacent ones of the light-emitting elements is two times or more greater than a distance from a display region of a module to the side edge of the light guide plate that the linear light source is arranged close to;
each light-emitting element being arranged on a surface of the respective accommodation space directly opposed to the opening, the linear member body being arranged such that light which is emitted by each light-emitting element includes at least a first portion of light which travels in a direction directly toward and out through the openings and a second portion of light which travels toward a surface of the linear member body such that the second portion of light will be reflected out through the openings;
the light guide plate includes a light-deflecting sheet arranged on a light-exit surface thereof; and
the light-deflecting sheet includes, located on a surface thereof facing the light-exit surface of the light guide plate, a plurality of projecting stripe members arranged substantially parallel to a direction of longer sides of the linear light source member.

2. The linear light source backlight system according to claim 1, wherein each of the plurality of accommodation spaces is filled with transparent resin with the light-emitting element accommodated therein, and
the openings of the plurality of accommodation spaces each measure about 4.0 mm or more in a direction of longer sides thereof.

3. The linear light source backlight system according to claim 1, wherein the light-emitting elements are arranged such that a distance between adjacent ones thereof is about 7.0 mm or more.

4. A planar display device comprising:
a backlight system including:
a light source;
a light guide plate arranged to guide light from the light source so as to surface-emit the light; wherein
the light source includes a linear light source member arranged close to a side edge of the light guide plate;
the linear light source member includes a linear member body including a plurality of accommodation spaces defined side-by-side therein in a direction extending along longer sides thereof such that individual partitions are arranged between the side-by-side accommodation spaces;
each of the plurality of the side-by-side accommodation spaces including an opening at a side thereof facing the light guide plate and housing only one light-emitting element, and a distance between adjacent ones of the light-emitting elements is two times or more greater than a distance from a display region of a module to the side edge of the light guide plate that the linear light source is arranged close to;
each light-emitting element being arranged on a surface of the respective accommodation space directly opposed to the opening, the linear member body being arranged such that light which is emitted by each light-emitting element includes at least a first portion of light which travels in a direction directly toward and out through the openings and a second portion of light which travels toward a surface of the linear member body such that second portion will be reflected out through the openings;
the light guide plate includes a light-deflecting sheet arranged on a light-exit surface thereof; and
the light-deflecting sheet includes, located on a surface thereof facing the light-exit surface of the light guide plate, a plurality of projecting stripe members arranged substantially parallel to a direction of longer sides of the linear light source member.

* * * * *